P. C. & O. A. FLAGSTAD.
MACHINE FOR MAKING PASTRY CONES.
APPLICATION FILED MAR. 11, 1910.
1,019,237.
Patented Mar. 5, 1912.
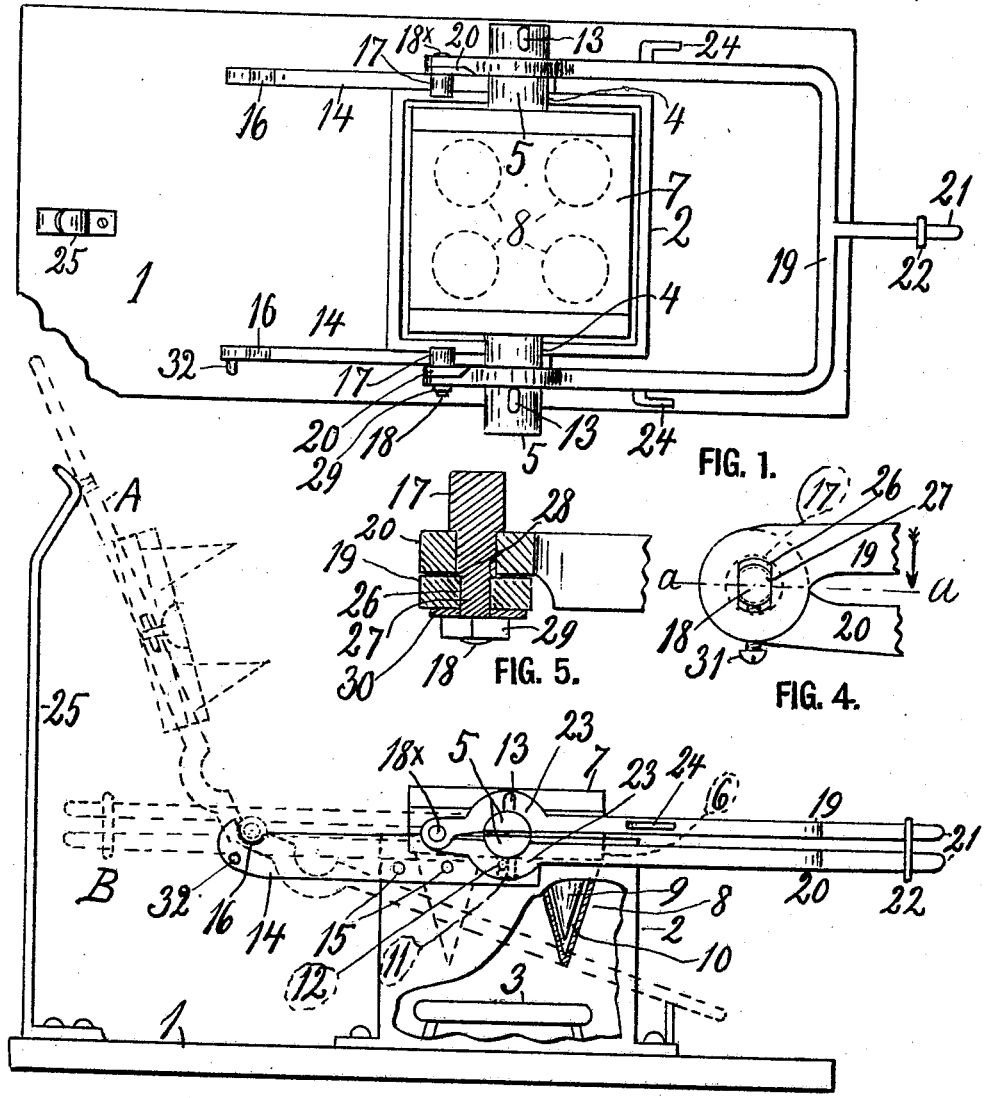
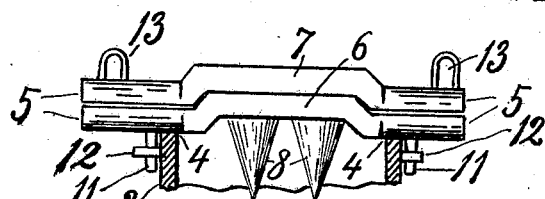
WITNESSES:
M. M. Carlsen
A. E. Carlsen
INVENTORS:
P. C. Flagstad
O. A. Flagstad
BY their ATTORNEY:
A. M. Carlsen

UNITED STATES PATENT OFFICE.

PETER CORNIE FLAGSTAD AND OSCAR A. FLAGSTAD, OF ST. PAUL, MINNESOTA.

MACHINE FOR MAKING PASTRY CONES.

1,019,237.  Specification of Letters Patent.  Patented Mar. 5, 1912.

Application filed March 11, 1910. Serial No. 548,611.

*To all whom it may concern:*

Be it known that we, PETER CORNIE FLAGSTAD and OSCAR A. FLAGSTAD, citizens of the United States, residing at St. Paul, in the county of Ramsey and State of Minnesota, have invented a new and useful Machine for Making Pastry Cones, of which the following is a specification.

Our invention relates to devices for molding and baking hollow pastry cones; and the object is to provide a machine of said kind with certain improvements, which will fully appear from the herein below description and claims; reference being had to the accompanying drawing, in which,—

Figure 1 is a top or plan view of our improved cone making machine. Fig. 2 is a partly sectional side elevation of the device with the joints of the levers modified and the levers in several dotted positions. Fig. 3 is a side view or edge view of the plates that carry the molds and cores of the device, showing portions of the stove casing in section. Fig. 4 is an enlarged side view of the joint at 18 in Figs. 1 and 5 with the nut and washer 29, 30 omitted. Fig. 5 is a section on line *a—a* of Fig. 4 with nut and washer restored.

Referring to the drawing by reference numerals, 1 designates a bench upon which is mounted a gas stove casing 2, having in its base a burner 3 and in its upper edge oppositely disposed open bearings 4, in which rotate the divided or split journals 5 of a pair of plates 6, 7, of which plate 6 is provided with conic molds 8 and plate 7 with conic cores 9 adapted to fit in the molds with spaces 10 between each core and its mold for the pastry to be molded and baked in. The journals of the mold plate 6 are each provided with a hook 11 adapted to catch under a stud 12 fixed in the side of the oven casing, to hold the plate down when the cone plate 7 is pulled upward therefrom after the plates are stuck together by the baked pastry. The journals of the core plate are each provided with a staple 13 or other suitable catch.

Rearward from the oven extends two horizontal parallel rails 14, which in the present instance are shown as secured at 15 to the sides of the oven casing, but they may also be cast integral with the oven casing and form extensions of the upper side edges of same. Near the rear end of each rail is provided a notch or open bearing 16. On said rails rest and slide the cylindrical heads 17 of pivot bolts 18 by which two bifurcated levers 19 and 20 are pivoted together. The ends of said levers are formed with handles 21 adapted to be held almost together by a ring 22. Near the pivoted or hinged end of each lever arm is formed an open bearing or notch 23 adapted to fit either side of the split journal so as to squeeze the plates firmly together when handles 21 are closed and inserted in the ring 22. Upon one side of each arm of lever 19 is fixed a finger 24; and rearward of the stove is provided a support 25.

In the operation of the machine when the gas stove is lighted and the mold and core plates heated by the gas flame, the operator opens the levers 19 and 20 sufficiently apart to slide them rearward on the rails 14 until the fingers 24 are slightly rearward of the staples 13; he then pulls the levers forward enough to pass the fingers 24 into the staples, he next raises the upper lever and the core plate with it to the position A in Fig. 2, or at least high enough to permit the paste to be placed in the molds, this done he brings the core plate down again upon the mold plate, where it is guided into exact position by dowel pins (not shown), he now unhooks the fingers 24 from the staples (or other catches on the plate), pulls the levers forward to grip and gain leverage on the journals, squeezes tightly and puts ring 22 in holding position; when the cones are partly baked with the plates in the position shown in Fig. 2, the plates are turned upside down by swinging the levers 19—20 upward and over to the position B where they remain until the baking is finished, the levers are then swung forward again, opened, pushed rearward and engaged with the fingers 24 in staples 13, and the upper lever and plate are brought upward to position A, leaning against the support 25 while the pastry cones are being removed from the cores. More paste is then filled into the molds and the operation is repeated. It will be observed that when the upper lever is in the raised position A, the heads or studs 17 rest in the notches 16 of the rails to prevent the studs from sliding forward on the rails.

When the journals 5 are substantially round, the hinge joints of the levers may have plain rivets with heads 17 and a reduced end portion riveted over as indicated at 18×, but when the journals vary in size and true cylindrical form the lever joints need some adjustment, as also for taking up wear on the journals; for these reasons we provide one lever with a slotted hole 26 (see Figs. 4 and 5) in which fits a flat portion 27 of the bolt 18 and the shoulders 28 of the bolt are drawn firmly against the slotted lever by a nut 29 bearing against a washer 30 that helps to bridge the slot, the lever 20 is thus free to swing on the pivot bolt between its head and the shoulder 28. 31 is an adjustment screw, screwed through the lever and against the side of the flattened portion of the pivot bolt to prevent lateral movement of the latter in the slot when the levers are used as powerful squeezers on the plate journals.

32 designates a peg in one of the rails to support the levers when they are in the rearward position B.

What we claim is:—

1. In a device of the kind described, a stove open at the top and provided in opposite sides of its top with open bearings, two rails extending rearwardly from the stove, two plates provided with meeting half journals adapted to rest in the bearings, conic molds on one of the plates and cores on the other plate to enter the molds with small spaces between them for the pastry, a pair of bifurcated levers pivoted together and having near said pivot-joint opposing open bearings adapted to engage over the half journals and squeeze them together, means at the free ends of the levers for holding them closed, catches on the core-carrying plate and catches on one of the levers to engage the first named catches for raising the core plate, and catching means on the oven and on the mold-carrying plate for retaining the latter in place when the other plate is being raised, said levers being slidingly supported on the rails.

2. In a device of the kind described, a stove open at the top and provided in opposite sides of its top with open bearings, two rails extending rearwardly from the stove and having each a notch near its rear end, two plates provided with meeting half journals adapted to rest in the bearings, conic molds on one of the plates and cores on the other plate to enter the molds with small spaces between them for the pastry, a pair of bifurcated levers pivoted together and having near said pivot joint opposing open bearings adapted to engage over the half journals and squeeze them together, means at the free ends of the levers for holding them closed, catches on the core-carrying plate and catches on one of the levers to engage the first named catches for raising the core plate, and catching means on the oven and on the mold-carrying plate for retaining the latter in place when the other plate is being raised, said levers being slidingly supported on the rails by means adapted to rest and rotate in the notches of the rails; the pivots connecting said levers being adjustable in one of the levers so as to permit the levers to close properly over journals of slightly varying sizes and contours.

3. In a device of the kind described, a stove open at the top and provided in opposite sides of its top with open bearings, two rails extending rearwardly from the stove and having each a notch near its rear end, two plates provided with meeting half journals adapted to occupy the bearings, conic molds on one of the plates and cores on the other plate to enter the molds with small intervening spaces between each core and mold, a pair of bifurcated levers pivoted together and having near said pivots opposing open bearings adapted to embrace the journals and squeeze them together, means at the free ends of the levers for holding them closed, catches on the core-carrying plate and means carried by one of the levers for engaging said catches for raising the core plate, catches on the stove and means on the mold-carrying plate for engaging the latter catches and retain the said plate in the bearings of the stove when the core plate is being raised, said levers having means sliding on the rails and adapted to engage in the notches in the rear ends thereof, for the purpose set forth.

In testimony whereof we affix our signatures, in presence of two witnesses.

P. CORNIE FLAGSTAD.
OSCAR A. FLAGSTAD.

Witnesses:
  M. M. CARLSEN,
  A. E. CARLSEN.